United States Patent
Doumae et al.

(10) Patent No.: US 11,968,173 B2
(45) Date of Patent: Apr. 23, 2024

(54) ADDRESS-SETTING DEVICE AND AIR CONDITIONING SYSTEM

(71) Applicant: DAIKIN INDUSTRIES, LTD., Osaka (JP)

(72) Inventors: Hiroshi Doumae, Osaka (JP); Shin Higashiyama, Osaka (JP); Hiroki Ueda, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 488 days.

(21) Appl. No.: 17/273,829

(22) PCT Filed: Aug. 28, 2019

(86) PCT No.: PCT/JP2019/033815
§ 371 (c)(1),
(2) Date: Mar. 5, 2021

(87) PCT Pub. No.: WO2020/054436
PCT Pub. Date: Mar. 19, 2020

(65) Prior Publication Data
US 2021/0320898 A1 Oct. 14, 2021

(30) Foreign Application Priority Data
Sep. 10, 2018 (JP) .................................. 2018-168871

(51) Int. Cl.
*H04L 61/5038* (2022.01)
*F24F 11/48* (2018.01)
(Continued)

(52) U.S. Cl.
CPC .......... *H04L 61/5038* (2022.05); *F24F 11/48* (2018.01); *H04L 12/46* (2013.01); *H04L 2101/622* (2022.05)

(58) Field of Classification Search
CPC ..... H04L 61/5038; H04L 12/46; H04L 67/12; F24F 11/48; G06T 7/001; G06F 13/4291; G06F 1/04
See application file for complete search history.

(56) References Cited

U.S. PATENT DOCUMENTS

| 7,565,470 B2* | 7/2009 | Lin ..................... G06F 13/4252 710/110 |
| 10,563,884 B2* | 2/2020 | Lian ........................ F24F 11/30 |
| 2008/0240212 A1 | 10/2008 | Satou | |

FOREIGN PATENT DOCUMENTS

| JP | 2001-148849 A | 5/2001 |
| JP | 2006-125657 A | 5/2006 |

(Continued)

OTHER PUBLICATIONS

Extended European Search Report for European Application No. 19859238.8, dated May 20, 2022.

(Continued)

*Primary Examiner* — Vernal U Brown
(74) *Attorney, Agent, or Firm* — Birch, Stewart, Kolasch & Birch, LLP

(57) ABSTRACT

A communication system includes a first device, second devices, and a communication line providing a serial connection from the first device to the second devices to establish a communication connection. An address setting device of the communication system is configured to set addresses of the second devices. The address setting device includes a communication controller. The communication controller is configured to transmit a transmission signal toward the second devices through the communication line and change at least one of an amplitude or a frequency of the transmission signal, and associate the addresses of the second devices with connection precedence of the second (Continued)

devices to the first device based on a reception signal received through the communication line.

20 Claims, 9 Drawing Sheets

(51) Int. Cl.
  *H04L 12/46* (2006.01)
  *H04L 101/622* (2022.01)

(56) References Cited

FOREIGN PATENT DOCUMENTS

| | | |
|---|---|---|
| JP | 2006-207949 A | 8/2006 |
| JP | 2008-109634 A | 5/2008 |

OTHER PUBLICATIONS

International Preliminary Report on Patentability and English translation of the Written Opinion of the International Searching Authority, dated Mar. 9, 2021, for International Application No. PCT/JP2019/033815.
International Search Report for International Application No. PCT/JP2019/033815 with English translation, dated Oct. 21, 2019.

* cited by examiner

US 11,968,173 B2

ADDRESS-SETTING DEVICE AND AIR CONDITIONING SYSTEM

TECHNICAL FIELD

The present disclosure relates to an address setting device and an air conditioning system including the address setting device.

BACKGROUND ART

An air conditioning system known in the art includes an outdoor unit, indoor units connected to the outdoor unit by a refrigerant pipe, and a communication line that establishes a communication connection between the outdoor unit and the indoor units. When performing maintenance checks or the like on such an air conditioning system, it is desirable that each indoor unit has an address associated with the installation location of the indoor unit. There has been various proposals on association of addresses of indoor units with installation locations of the indoor units.

Patent Document 1 discloses an example of an air conditioner in which indoor units are serially connected from an outdoor unit by a communication line and addresses of the indoor units are set as follows. In a mode that automatically sets addresses of the indoor units, the addresses stored in the indoor units are deleted, and communication circuit disconnectors of the indoor units disconnect a communication circuit. Each indoor unit includes a controller connected to the communication line at a position closer to the outdoor unit than the communication circuit disconnector. Therefore, when the outdoor unit outputs an address assigning command, the address is assigned to the one of the indoor units located closest to the outdoor unit. Then, the communication circuit is connected by the communication circuit disconnector of the indoor unit located closest to the outdoor unit. As described above, when the address setting of the indoor units is performed in order starting from ones of the indoor units located closer to the outdoor unit, the address of each indoor unit is associated with the connection precedence of the indoor unit to the outdoor unit.

PRIOR ART DOCUMENT

Patent Document

Patent Document 1: Japanese Laid-Open Patent Publication No. 2006-125657

SUMMARY OF THE INVENTION

Problems that the Invention is to Solve

In the address setting method of Patent Document 1, the communication circuit disconnectors switch between disconnection and connection of the communication line to set the indoor unit that is allowed to communicate with the outdoor unit. However, controlling the communication circuit disconnectors in the automatic address setting mode is complex. There is room for improvement.

It is an objective of the present disclosure to provide an address setting device and an air conditioning system that readily associate identification information set for each indoor unit with position information of the indoor unit.

Means for Solving the Problems

An aspect of the present disclosure provides an address setting device (20) in a communication system. The communication system includes a first device, second devices, and a communication line providing a serial connection from the first device to the second devices to establish a communication connection. The address setting device (20) is configured to set addresses of the second devices. The address setting device (20) includes a communication controller (21). The communication controller (21) is configured to transmit a transmission signal toward the second devices through the communication line and change at least one of an amplitude or a frequency of the transmission signal, and associate the addresses of the second devices with connection precedence of the second devices to the first device based on a reception signal received through the communication line.

This configuration changes the transmission distance of a transmission signal through the communication line by changing at least one of the amplitude or frequency of the transmission signal. Thus, among the second devices, there is a second device that receives the transmission signal and a second device that cannot receive the transmission signal. The connection precedence of the second device that receives the transmission signal to the first device is determined by the relationship between the distance between the first device and the second device in the communication line. The addresses of the second devices are readily associated with the connection precedence of the second devices to the first device.

MODES FOR CARRYING OUT THE INVENTION

First Embodiment

The configuration of an air conditioning system 1 including an address setting device 20 will be described below with reference to the drawings.

Figure 1:
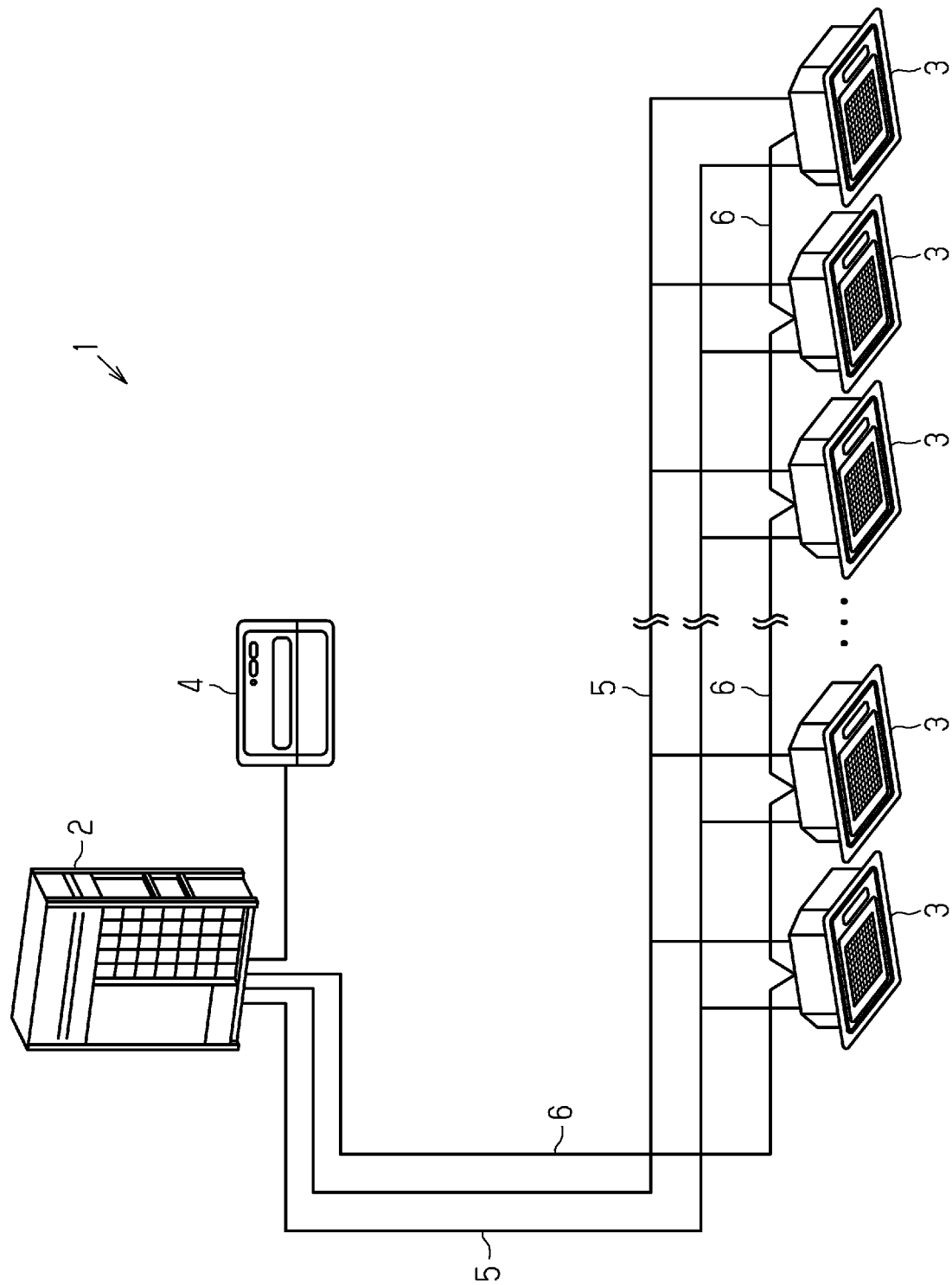
FIG. 1 is a schematic configuration diagram showing a first embodiment of an air conditioning system.

As shown in FIG. 1, the air conditioning system 1 includes an outdoor unit 2, which is an example of a first device installed outdoors, and indoor units 3, which are an example of second devices installed indoors. In the present embodiment, the air conditioning system 1 includes eleven indoor units 3. The air conditioning system 1 is set, for example, in a structure such as an office building or a tenant building. The outdoor unit 2 is connected to each indoor unit 3 by a refrigerant pipe 5. The outdoor unit 2 is also connected to each indoor unit 3 by a communication line 6. An example of the communication line 6 is an air conditioning communication line. More specifically, the communication line 6 provides a serial connection from the outdoor unit 2 to the indoor units 3 (in the present embodiment, eleven indoor units 3) to establish a communication connection. In the present embodiment, the air conditioning system 1 further includes a system management device 4 connected to the outdoor unit 2 by the communication line 6. The system management device 4 is an example of a central management device and, for example, receives an instruction from a user managing a structure such as a building and centrally controls the outdoor unit 2 and the indoor units 3. As described above, the air conditioning system 1 is an example of a communication system including a first device, second devices, and a communication line that provides serial connection from the first device to the second devices to establish a communication connection.

The configuration of the air conditioning system 1 may be appropriately changed. For example, two to ten indoor units 3 or twelve indoor units 3 or more may be serially connected to one outdoor unit 2. Alternatively, the configuration may include two or more outdoor units 2 and serially connect two or more indoor units 3 to each outdoor unit 2. The system management device 4 may be omitted.

In the air conditioning system 1, there is a need to improve controllability of the outdoor unit 2 and the indoor units 3. The outdoor unit 2 and the indoor units 3 need to be finely controlled in accordance with, for example, changing of the set temperature and changes in temperature such as room temperature. Therefore, the air conditioning system 1 is configured to perform high-speed communication between the outdoor unit 2 and the indoor units 3.

Figure 2:
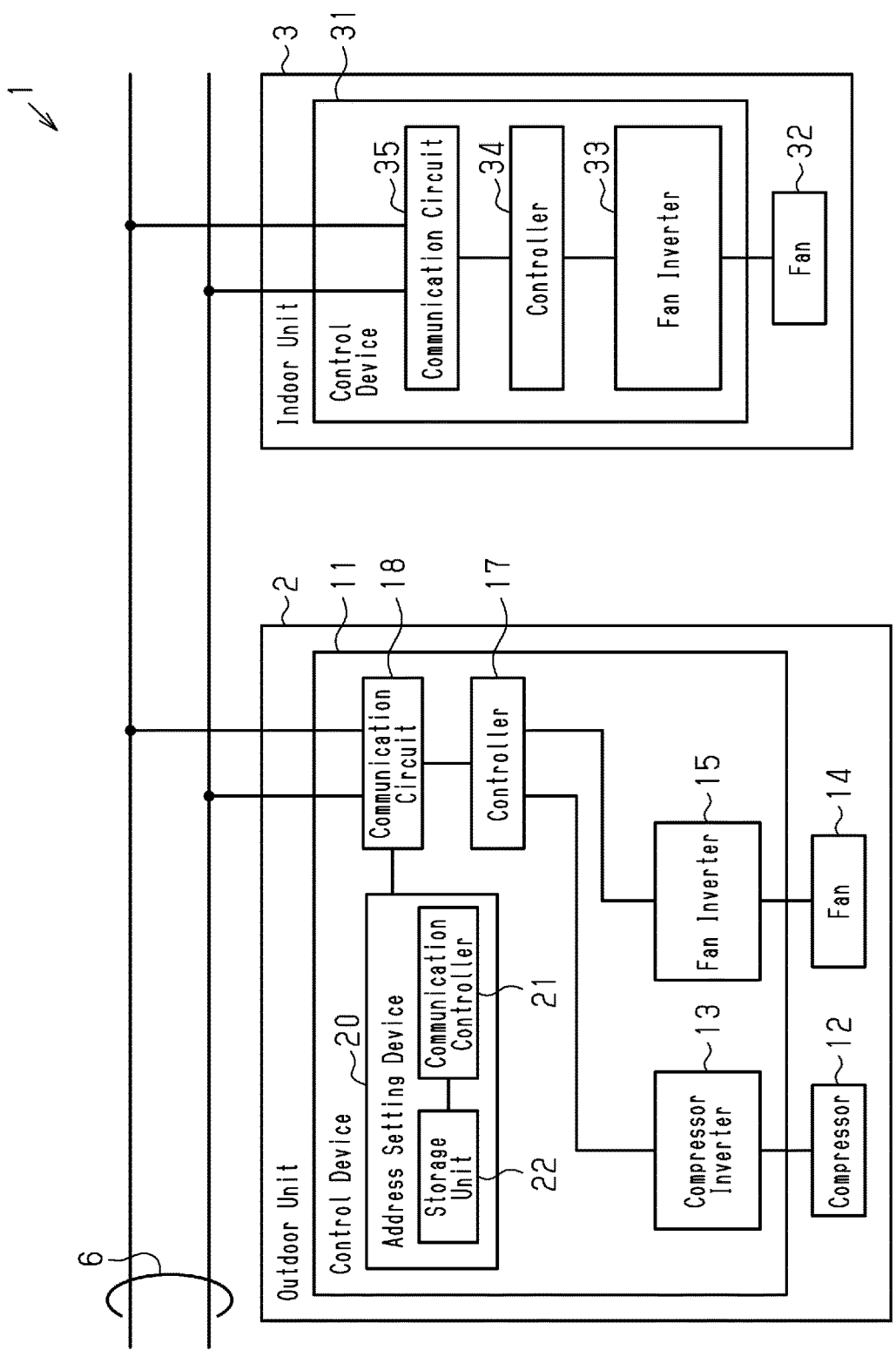
FIG. 2 is a schematic block diagram showing an outdoor unit and an indoor unit of the air conditioning system.

As shown in FIG. 2, the outdoor unit 2 includes, for example, a control device 11, a compressor 12, a fan 14, an outdoor-side heat exchanger, and various valves. The compressor 12, the fan 14, the outdoor-side heat exchanger, and the various valves are connected by a refrigerant pipe. In the present embodiment, the control device 11 further includes a compressor inverter 13 and a fan inverter 15.

The compressor 12 is, for example, a scroll-type or screw-type displacement compressor and draws in and compresses a refrigerant and then discharges the refrigerant. The compressor 12 includes a motor as a drive source. The compressor inverter 13 includes switching elements for driving the motor of the compressor 12. The switching elements are, for example, insulated gate bipolar transistors (IGBTs). The control device 11 includes a controller 17 that controls activation and deactivation of the switching elements using a predetermined carrier frequency (e.g., 6 kHz). The activation and deactivation of the switching elements drive the compressor 12.

The fan 14 is an air blower that creates an air flow that flows in the outdoor unit 2 and through the outdoor-side heat exchanger and then flows out of the outdoor unit 2. The fan 14 includes a motor as a drive source. The fan inverter 15 includes switching elements for driving the motor of the fan 14. The switching elements are, for example, IGBTs. The controller 17 of the control device 11 controls activation and deactivation of the switching elements of the fan inverter 15. The activation and deactivation of the switching elements drive the fan 14.

The control device 11 is configured to be, for example, a control board on which a central processing unit (CPU) or a micro processing unit (MPU) is mounted. The control device 11 includes the controller 17, a communication circuit 18, and the address setting device 20. In the present embodiment, the compressor inverter 13, the fan inverter 15, the controller 17, the communication circuit 18, and the address setting device 20 are formed on the control board. At least one of the compressor inverter 13 or the fan inverter 15 may be arranged separately from the control device 11. That is, at least one of the compressor inverter 13 or the fan inverter 15 may be formed on a control board that differs from the control board configured as the control device 11.

The controller 17 is electrically connected to the communication circuit 18. The controller 17 includes, for example, an arithmetic processing unit that executes a predetermined control program and a storage unit. The arithmetic processing unit includes, for example, a CPU or an MPU. The storage unit stores various control programs and information used for various control processes. The storage unit includes, for example, a nonvolatile memory and a volatile memory.

The communication circuit 18 is configured to communicate with a communication circuit 35 of the indoor unit 3 and is connected to the communication line 6. A coupling capacitor and a noise cut transformer (neither shown) may be arranged between the communication circuit 18 and the communication line 6.

The communication circuit 18 outputs a signal for transmitting operating data to the communication line 6. The communication line 6 includes two signal lines including a positive signal line and a negative signal line. The operating data includes, for example, an on/off instruction transmitted from a remote controller or the like and temperature information obtained by a temperature sensor. The controller 17 controls the operating frequency of the compressor 12, the rotational speed of the fan 14, and the opening-closing and switching of the various valves based on such operating data.

The address setting device 20 associates installation locations of the indoor units 3 (precedence of connection to the outdoor unit 2) with addresses of the indoor units 3. The address setting device 20 includes a communication controller 21 and a storage unit 22. The address of each indoor unit 3 includes, for example, identification information of the indoor unit 3. In an example, the address of the indoor unit 3 is a media access control (MAC) address.

The communication controller 21 is electrically connected to the communication circuit 18. The communication controller 21 includes, for example, an arithmetic processing unit that executes a predetermined control program and a storage unit. The arithmetic processing unit includes, for example, a CPU or an MPU. The communication controller 21 transmits a transmission signal toward the indoor units 3 through the communication line 6. An example of the transmission signal is a response determination signal. The communication controller 21 receives a reception signal from each indoor unit 3 through the communication line 6. An example of the reception signal is a response signal. The communication controller 21 associates the address of the indoor unit 3 with the connection precedence of the indoor unit 3 to the outdoor unit 2 based on the response signal received from the indoor unit 3. The connection precedence of the indoor unit 3 to the outdoor unit 2 is indicated by distance between the outdoor unit 2 to the indoor unit 3 connected through the communication line 6. The precedence is determined, for example, in order starting from the indoor units 3 having shorter distances from the outdoor unit 2 through the communication line 6.

The storage unit 22 stores various control programs and information used for various control processes. The storage unit 22 also stores layout data (device installation data) showing installation locations of the indoor units 3 on a floor of a structure such as a building. The storage unit includes, for example, a nonvolatile memory and a volatile memory.

Each indoor unit 3 includes, for example, a control device 31, a fan 32, a fan inverter 33, an indoor-side heat exchanger, and an expansion valve. The fan 32 is an air blower that creates an air flow that flows in the indoor unit 3 and through the indoor-side heat exchanger and then flows out of the indoor units 3. The fan 32 includes a motor as a drive source. The fan inverter 33 includes switching elements for driving the motor of the fan 32. The switching elements are, for example, IGBTs. The control device 31 includes a controller 34 that controls activation and deactivation of the switching elements of the fan inverter 33 to adjust the rotational speed of the fan 32 and control the flow rate of the generated air flow.

The control device 31 is configured to be, for example, a control board on which a CPU or an MPU is mounted. The control device 31 includes the controller 34 and the communication circuit 35.

The controller 34 is electrically connected to the communication circuit 35. The controller 34 includes, for example, an arithmetic processing unit that executes a predetermined control program and a storage unit. The arithmetic processing unit includes, for example, a CPU or an MPU. The storage unit stores various control programs and information used for various control processes. The storage unit includes, for example, a nonvolatile memory and a volatile memory.

The communication circuit 35 is configured to communicate with the communication circuit 18 of the outdoor unit 2 and is connected to the communication line 6. A coupling capacitor and a noise cut transformer (neither shown) may be arranged between the communication circuit 35 and the communication line 6. The communication circuit 35 outputs a signal for transmitting operating data to the communication line 6. The communication circuit 35 also receives operating data from a signal received from the communication line 6.

The operation of the address setting device 20 will now be described.

The communication controller 21 of the address setting device 20 executes an address setting process that associates the installation locations of the indoor units 3 stored in device installation data, in which the installation locations of the indoor units 3 are set, with the addresses of the indoor units 3 and the connection precedence of the indoor units 3 to the outdoor unit 2.

Figure 3:
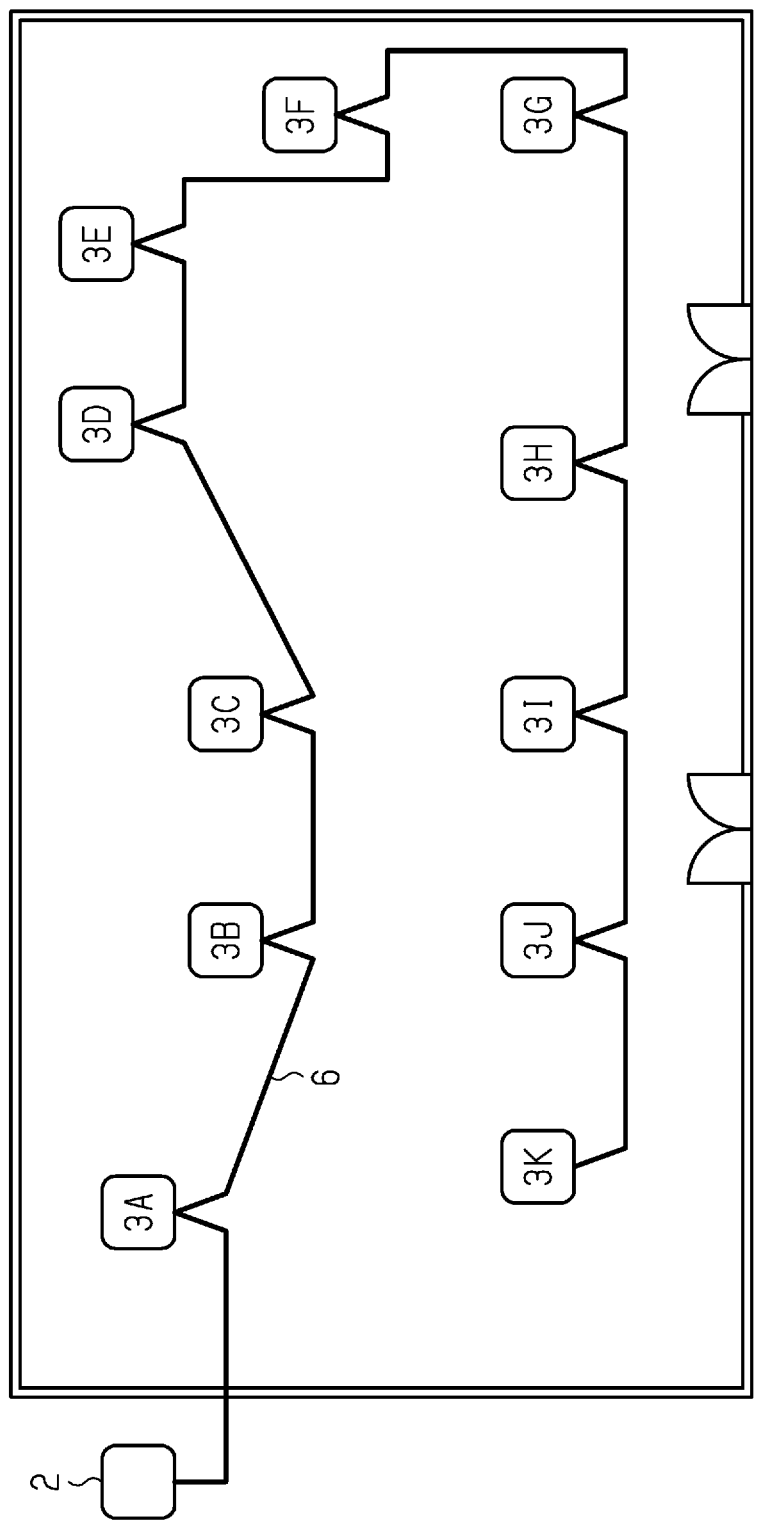
FIG. 3 is a plan view showing an example of device installation data.

The device installation data is stored, for example, in the storage unit 22. FIG. 3 shows an example of device installation data. FIG. 3 shows eleven indoor units 3 (hereafter, referred to as "the indoor units 3A to 3K") that are arranged on, for example, a floor, and the communication line 6 that serially connects the indoor units 3A to 3K. In FIG. 3, the indoor units 3A, 3B, 3C, 3D, 3E, 3F, 3G, 3H, 3I, 3J, and 3K are sequentially arranged starting from ones located closer to the outdoor unit 2.

Figure 4:
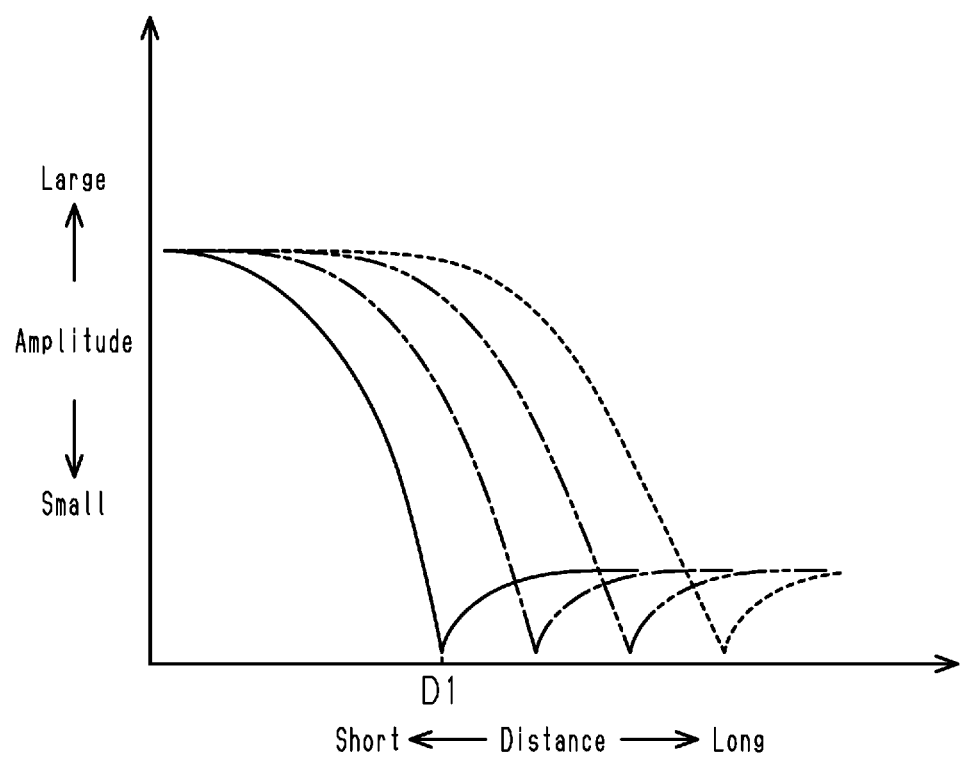
FIG. 4 is a graph showing a relationship between distance from the outdoor unit in a communication line and amplitude of transmission signals having different frequencies and transmitted by a communication controller of the address setting device.

The communication controller 21 transmits a transmission signal (response determination signal) toward the indoor units 3A to 3K through the communication line 6. FIG. 4 shows an example of a relationship between amplitude of a transmission signal and distance from the outdoor unit 2 in the communication line 6. As shown in FIG. 4, the amplitude of the transmission signal decreases as the distance from the outdoor unit 2 in the communication line 6 increases. As the frequency of the transmission signal increases, the distance from the outdoor unit 2 in the communication line 6 decreases. Although not shown in FIG. 4, as the amplitude of the transmission signal increases, the distance from the outdoor unit 2 in the communication line 6 increases.

FIG. 4 shows a solid line, a single-dashed line, a double-dashed line, and a broken line indicating frequency bands of the transmission signal. The frequency bands become lower from the solid line toward the single-dashed line, the double-dashed line, and the broken line. In each of the solid line, the single-dashed line, the double-dashed line, and the broken line shown in FIG. 4, the amplitude of the transmission signal attenuates in accordance with its corresponding frequency band. For example, the amplitude of the transmission signal having the frequency band indicated by the solid line is smallest at distance D1 from the outdoor unit 2. That is, transmission signals attenuate at different distances in accordance with the frequency bands.

In the present embodiment, the communication controller 21 changes the amplitude and frequency of each transmission signal. More specifically, to extend the distance of a transmission signal transmitted through the communication line 6, the communication controller 21 gradually increases the amplitude of the transmission signal or gradually lowers the frequency band of the transmission signal. The amplitude and frequency band of the transmission signal are set in accordance with the maximum length of the communication line 6 connected to the outdoor unit 2. In the present embodiment, when the amplitude and frequency band of a transmission signal is adjusted, the transmission signal reaches the indoor unit 3K.

Figure 5:
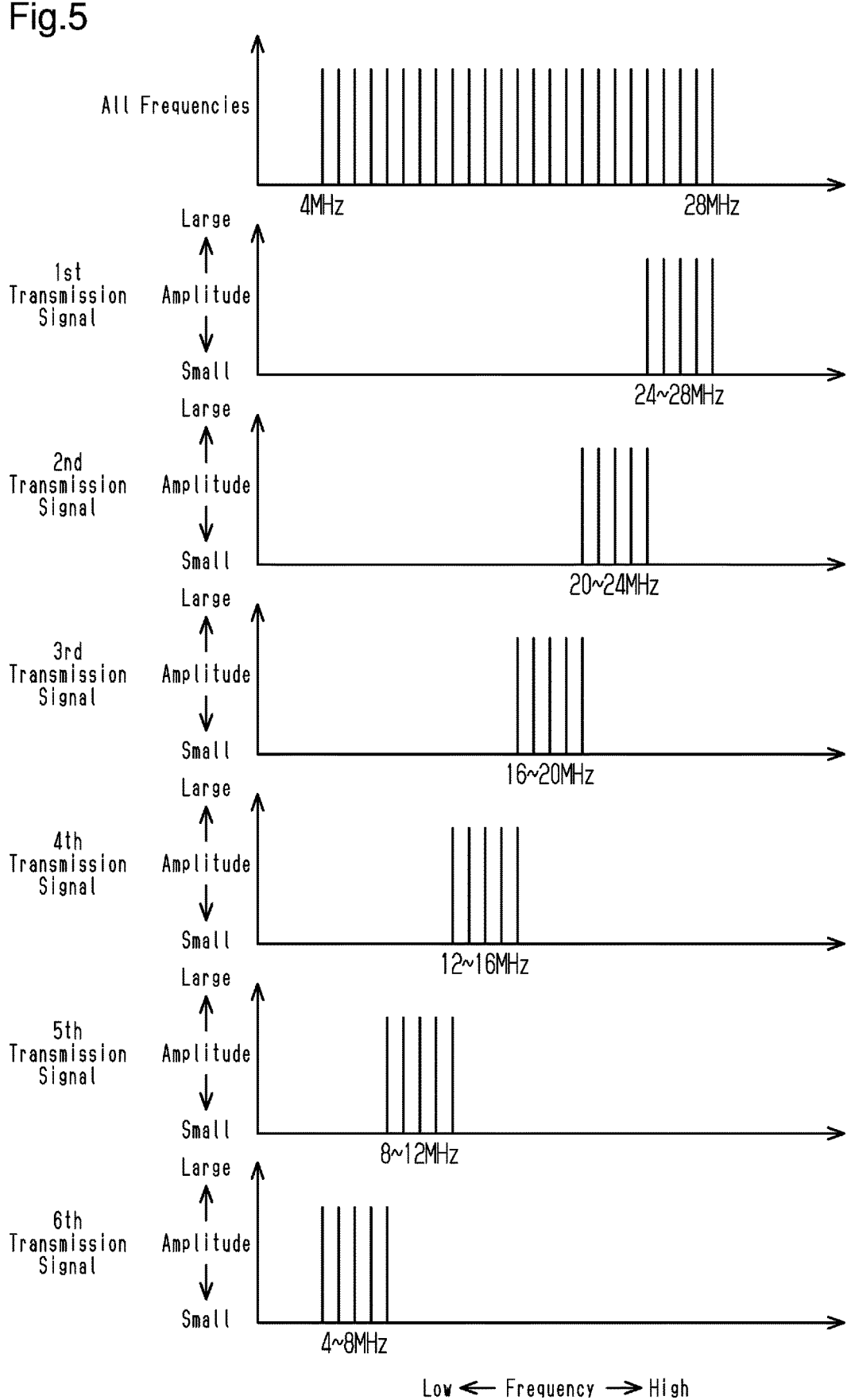
FIG. 5 is a diagram showing first to sixth transmission signals obtained by changing the frequency band of a transmission signal.

The communication controller 21 is configured to use signals having a predetermined frequency width in communication. In addition, the communication controller 21 is configured to divide the entirety of the frequencies usable in communication into sections and to transmit transmission signals having each divided frequency band. In an example, as shown in FIG. 5, the communication controller 21 is configured to transmit transmission signals having a frequency band of 4 MHz or higher and 28 MHz or lower. The communication controller 21 transmits transmission signals that are, for example, divided into a first transmission signal S1 having a frequency band of 24 MHz or higher and 28 MHz or lower, a second transmission signal S2 having a frequency band of 20 MHz or higher and 24 MHz or lower, a third transmission signal S3 of 16 MHz or higher and 20 MHz or lower, a fourth transmission signal S4 of 12 MHz or higher and 16 MHz or lower, a fifth transmission signal S5 of 8 MHz or higher and 12 MHz or lower, and a sixth transmission signal S6 of 4 MHz or higher and 8 MHz or lower. Transmission signals may be, for example, divided into a first transmission signal S1 having a frequency band of 24 MHz or higher and 28 MHz or less, a second transmission signal S2 having a frequency band of 20 MHz or higher and less than 24 MHz, a third transmission signal S3 having a frequency band of 16 MHz or higher and less than 20 MHz, a fourth transmission signal S4 having a frequency band of 12 MHz or higher and less than 16 MHz, a fifth transmission signal S5 having a frequency band of 8 MHz or higher and less than 12 MHz, and a sixth transmission signal S6 having a frequency band of 4 MHz or higher and less than 8 MHz. The entire frequency band of transmission signals and the frequency band of each transmission signal may be appropriately changed. The frequency bands of transmission signals may be set to partially overlap. For example, the frequency band of the first transmission signal S1 may be 20 MHz to 28 MHz, and the frequency band of the second transmission signal S2 may be 18 MHz to 24 MHz.

For each of the first to sixth transmission signals S2 to S6, the communication controller 21 transmits, for example, a transmission signal having a first amplitude A1, a transmission signal having a second amplitude A2 that is greater than the first amplitude A1, and a transmission signal having a third amplitude A3 that is greater than the second amplitude A2.

When the controllers 34 of the indoor units 3A to 3K receive one of the first to sixth transmission signals S1 to S6, the controllers 34 transmit a reception signal (response signal) toward the outdoor unit 2 through the communication line 6. Reception signals of the indoor units 3A to 3K include addresses (e.g., MAC addresses) of the indoor units 3A to 3K.

As described above, the frequency bands are changed as in the first to sixth transmission signals S1 to S6, and the amplitude of each transmission signal is changed, so that the transmission signals have different reachable distances, that is, the indoor units 3 are configured to receive different transmission signals. More specifically, one of the indoor units 3A to 3K receives a transmission signal (response determination signal). The one of the indoor units 3 that receives the transmission signal from the outdoor unit 2 transmits a reception signal (response signal). This associates the connection precedence and addresses of the indoor units 3 that are actually installed with the indoor units 3A to 3K that are in device installation data.

Figure 6:
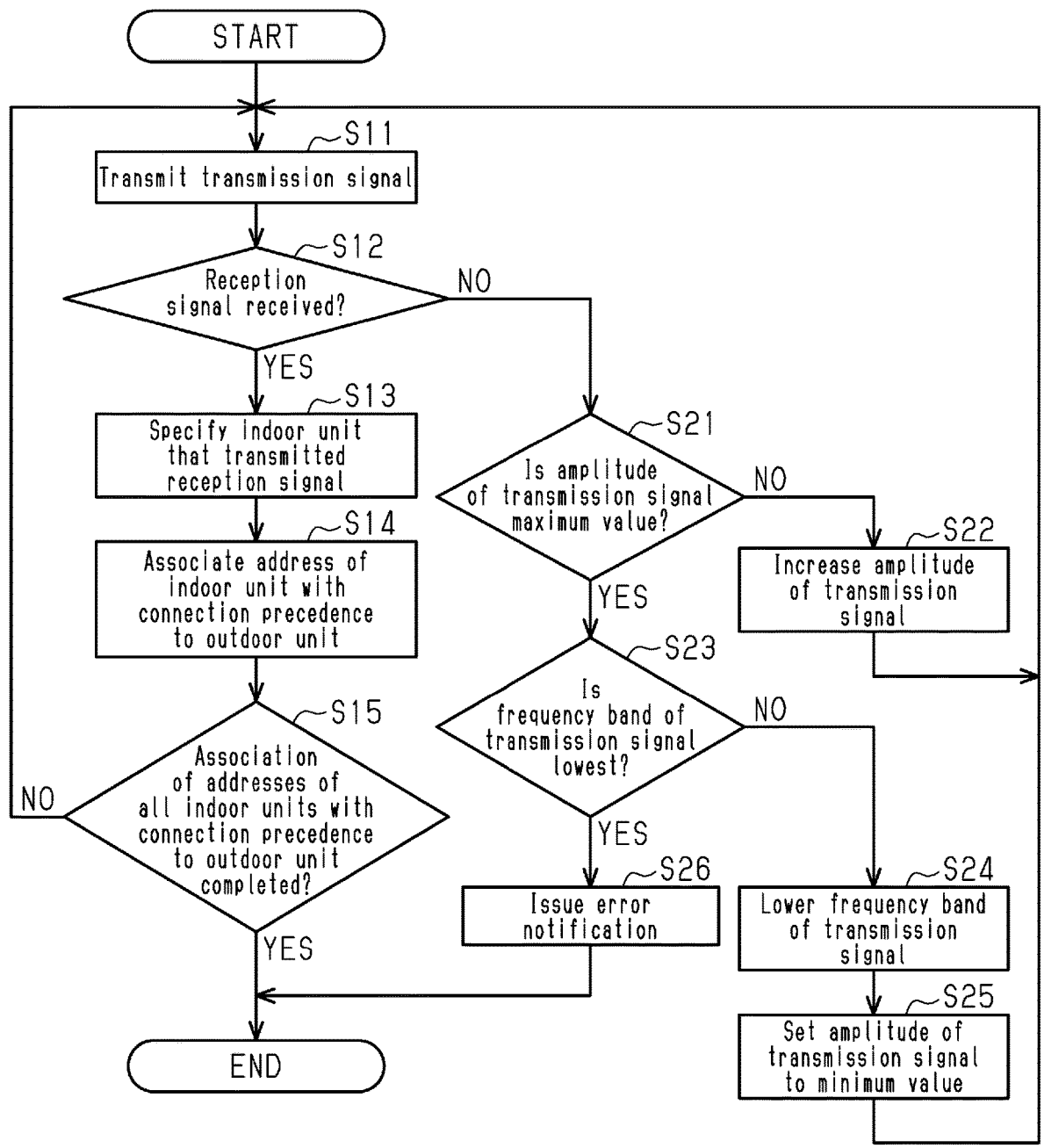
FIG. 6 is a flowchart showing an example of the procedure of an address setting process executed by the communication controller.

An example of the procedure of the address setting process executed by the communication controller 21 will be described with reference to FIG. 6. The address setting process is started when a person operates, for example, an operating unit arranged on the control device 11 of the outdoor unit 2. In an example, a button is arranged on the control board, which is configured as the control device 11, and is long-pressed to start the address setting process.

In step S11, the communication controller 21 transmits a transmission signal toward the indoor units 3 and proceeds to step S12. In an example, after the address setting process is started, the communication controller 21 first transmits a transmission signal having the shortest reachable distance, that is, a transmission signal having the smallest amplitude and the highest frequency band, toward the indoor units 3 through the communication line 6. In the present embodiment, after the address setting process is started, the communication controller 21 first transmits the first transmission signal S1 having the first amplitude A1 toward the indoor units 3A to 3K (refer to FIG. 3) through the communication line 6.

In step S12, the communication controller 21 determines whether a reception signal is received. If the reception signal is received, the communication controller 21 proceeds to step S13 and specifies the indoor unit 3 that transmitted the reception signal and then proceeds to step S14. In an example, as shown in FIG. 3, when only the indoor unit 3A receives the transmission signal, the indoor unit 3A transmits a reception signal toward the outdoor unit 2 (communication controller 21) through the communication line 6. The communication controller 21 determines that the indoor unit that transmitted the reception signal is the indoor unit 3A from the MAC address included in the reception signal received from the indoor unit 3A.

In step S14, the communication controller 21 uses the reception signal to associate the connection precedence with the address of the indoor unit 3 that transmitted the reception signal and then proceeds to step S15. In step S15, the communication controller 21 determines whether the association of the address with the connection precedence to the outdoor unit 2 has been performed on all of the indoor units 3 connected to the outdoor unit 2 through the communication line 6. If it is determined that the association of the address with the connection precedence to the outdoor unit 2 has been performed on all of the indoor units 3, the communication controller 21 ends the process. If it is determined that the association of the address with the connection precedence to the outdoor unit 2 has not been performed on all of the indoor units 3, that is, it is determined that the association of the address with the connection precedence to the outdoor unit 2 has not been performed on one or more of the indoor units 3, the communication controller 21 proceeds to step S11. The communication controller 21 obtains the number of indoor units 3 connected to the outdoor unit 2 through the communication line 6 from device layout data.

Thus, the communication controller 21 obtains the number of indoor units 3 connected to the outdoor unit 2 from the device installation data and repeatedly changes at least one of the amplitude or the frequency of a transmission signal and transmits the transmission signal until the addresses of the indoor units 3, which correspond to the number of indoor units 3 connected, are associated with the connection precedence to the outdoor unit 2.

When the communication controller 21 transmits a transmission signal but determines that a reception signal is not received, the communication controller 21 changes at least one of the amplitude or the frequency of the transmission signal as shown in steps S21 to S26 and again transmits the transmission signal.

More specifically, in step S21, the communication controller 21 determines whether the amplitude of the transmission signal is a maximum value. The maximum value of the amplitude of the transmission signal is, for example, an upper limit value of a set amplitude range of the transmission signal. In an example, when the amplitude of the transmission signal is set to one of the first amplitude A1, the second amplitude A2, and the third amplitude A3, the communication controller 21 determines whether the amplitude of the transmission signal that was transmitted in step S11 equals the third amplitude A3.

If it is determined that the amplitude of the transmission signal is not the maximum value, the communication controller 21 proceeds to step S22. In step S22, the communication controller 21 increases the amplitude of the transmission signal and then proceeds to step S11. In an example, when the amplitude of the transmission signal that was transmitted in step S11 equals the first amplitude A1, the communication controller 21 proceeds to step S22 to set the amplitude of the transmission signal to the second amplitude A2 and then proceeds to step S11. In this case, in step S11, the communication controller 21 transmits the transmission signal having the second amplitude A2. When the transmission signal having the second amplitude A2 is transmitted in step S11 but a reception signal is not received, the communication controller 21 sets the amplitude of the transmission signal to the third amplitude A3 in step S22 and then proceeds to step S11. Thus, the communication controller 21 gradually increases the amplitude of the transmission signal.

If it is determined that the amplitude of the transmission signal is the maximum value, the communication controller 21 proceeds to step S23. In step S23, the communication controller 21 determines whether the frequency band of the transmission signal is a lowest frequency band. The lowest frequency band of the transmission signal is, for example, a frequency band including a lower limit value of a set frequency band of the transmission signal. In an example, when the transmission signal is set to one of the first to sixth transmission signals S1 to S6, the communication controller 21 determines whether the transmission signal that was transmitted in step S11 is the sixth transmission signal S6.

If it is determined that the frequency band of the transmission signal is not the lowest frequency band, the communication controller 21 proceeds to step S24. In step S24, the communication controller 21 lowers the frequency band of the transmission signal. In step S25, the communication controller 21 sets the amplitude of the transmission signal having the changed frequency band to a minimum value and then proceeds to step S11. In an example of steps S24 and S25, when the transmission signal that was transmitted in step S11 is the first transmission signal S1, the communication controller 21 sets the transmission signal to the second transmission signal S2 in step S24. Then, the communication controller 21 sets the amplitude of the second transmission signal S2 to the first amplitude A1 and proceeds to step S11. In this case, in step S11, the communication controller 21 transmits the second transmission signal S2 having the first amplitude A1. Thus, the communication controller 21 gradually lowers the frequency of the transmission signal.

As shown in steps S21 to S25, in the present embodiment, the amplitude of the transmission signal is gradually increased. After the amplitude reaches the maximum value, the frequency of the transmission signal is lowered and the amplitude is set to the minimum value.

If it is determined that the frequency band of the transmission signal is the lowest frequency band, the communication controller 21 proceeds to step S26. In step S26, the communication controller 21 issues notification of an error indicating that there is an indoor unit 3 in which the address cannot be associated with the connection precedence to the outdoor unit 2 and ends the process. In an example, the communication controller 21 issues notification of an error with a notification unit (not shown) arranged on the outdoor unit 2. Examples of the notification unit include a light emitting diode (LED), a display, and a speaker. When issuing notification of an error in step S26, for example, the communication controller 21 intermittently illuminates the LED. When issuing notification of an error in step S26, for example, the communication controller 21 shows the error on the display. When issuing notification of an error in step S26, for example, the communication controller 21 issues notification of the error with the speaker. Thus, the error is notified to an operator performing the task of associating the addresses of the indoor units 3 with the connection precedence of the indoor units 3 to the outdoor unit 2.

In the present embodiment, the communication controller 21 executes the address setting process multiple times. Thus, the communication controller 21 reduces missing (recognition error) of the indoor units 3 and errors in the connection precedence.

The amplitude of the transmission signal transmitted from the outdoor unit 2 decreases as the transmission signal is transmitted away from the outdoor unit 2. As shown in FIG. 4, the amplitude may be extremely small. It is assumed that the amplitude is attenuated by reflection of the signal in the communication line 6. The distance at which the amplitude is decreased may vary depending on the frequency band of the transmission signal. For example, as shown in FIG. 4, the amplitude of a transmission signal having a lower frequency band is extremely small at a position more distant from the outdoor unit 2. For example, the transmission signal having the frequency band indicated by the solid line is extremely small at distance D1. Since an indoor unit 3 located near distance D1 does not respond to the transmission signal, the outdoor unit 2 cannot recognize the indoor unit 3 and cannot obtain the address. An indoor unit 3 located farther than distance D1 responds to the transmission signal. The outdoor unit 2 recognizes the indoor unit 3 that responded and obtains the address. This generates an error in the connection precedence. For example, in FIG. 3, when the indoor unit 3C is located near distance D1 shown in FIG. 4, the indoor unit 3C does not respond to the transmission signal. If the indoor unit 3D, which is located farther from the outdoor unit 2 than the indoor unit 3C, responds to the transmission signal, the indoor unit 3D will be recognized (address will be obtained) immediately after the indoor unit 3B.

In this regard, the communication controller 21 changes the frequency band of the transmission signal. For example, when transmitting a transmission signal having the frequency band indicated by the single-dashed line shown in FIG. 4, the amplitude of the transmission signal is extremely small at a distance that is farther from the outdoor unit 2 than distance D1, which corresponds to the transmission signal having the frequency band indicated by the solid line. In the example described below, the indoor unit 3C located near distance D1 responds to the transmission signal having the frequency band indicated by the single-dashed line. This ensures obtainment of the address of the indoor unit 3C. Since the indoor unit 3C is recognized immediately after the indoor unit 3B, the addresses are obtained in accordance with the correct connection precedence.

An error may occur in obtained connection precedence depending on the amplitude and the frequency band of the transmission signal. For example, referring to FIG. 3, after the address of the indoor unit 3D is obtained, the address of the indoor unit 3C may be obtained. In this case, the addresses are associated with incorrect connection precedence.

As described above, when the address setting process is executed multiple times, the address of an indoor unit 3 may be associated with correct connection precedence, while the address of an indoor unit 3 may be associated with incorrect connection precedence.

In this regard, the communication controller 21 executes a determination process that determines connection precedence of the indoor units 3 to the outdoor unit 2 based on results of association of the installation locations of the indoor units 3A to 3K stored in the device installation data with connection precedence of the actual installed indoor units 3 to the outdoor unit 2, which are obtained through multiple executions of the address setting process.

Figure 7:
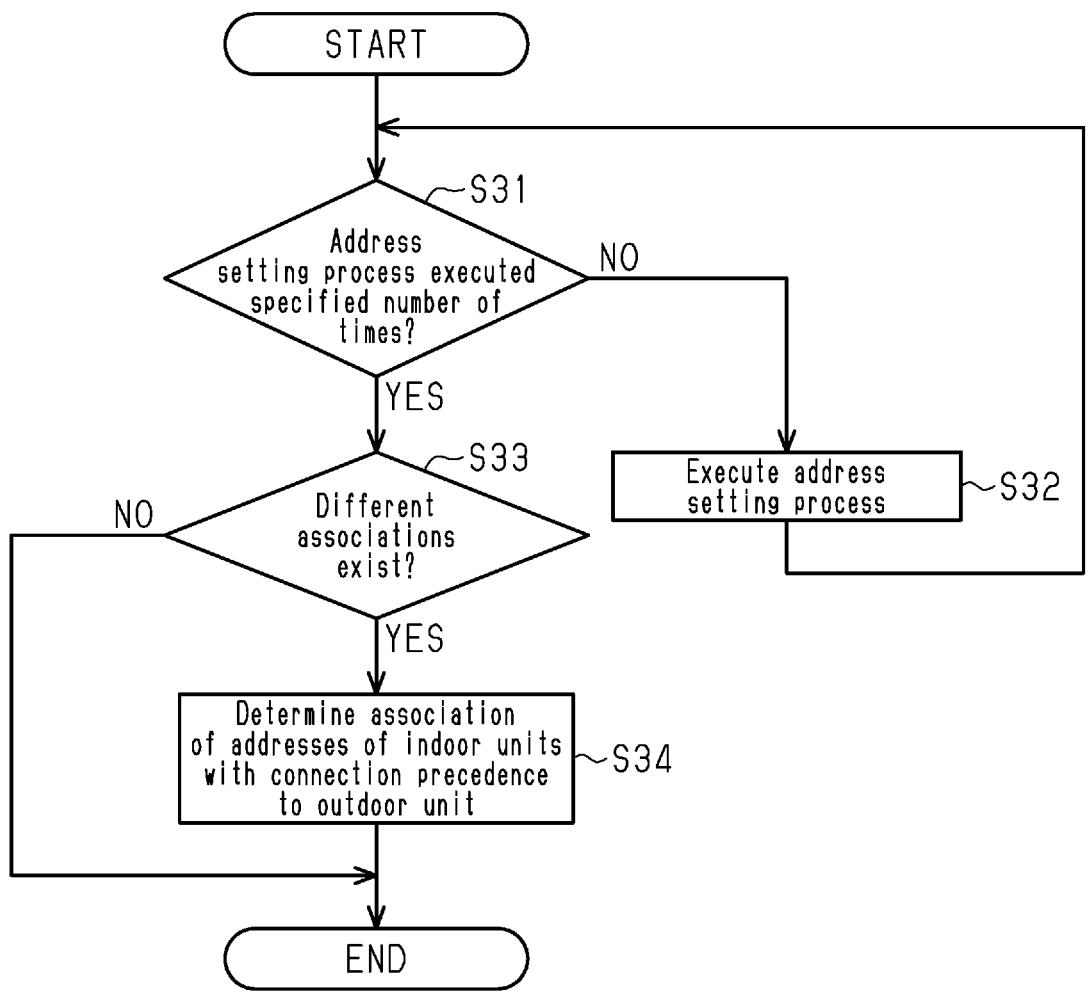
FIG. 7 is a flowchart showing an example of the procedure of a determination process executed by the communication controller.

An example of the procedure of the determination process executed by the communication controller 21 will be described with reference to FIG. 7. The determination process is started, for example, simultaneously with the address setting process.

In step S31, the communication controller 21 determines whether the address setting process has been executed a specified number of times. The specified number of times is predetermined. The specified number of times is set in advance and is a number of times at which it is assumed that the connection precedence of the indoor units 3 to the outdoor unit 2 is determined. The specified number of times is, for example, six times or seven times. The specified number of times may be changed to any number of times by the operator.

If it is determined that the number of times the address setting process is executed is less than the specified number of times, the communication controller 21 proceeds to step S32. In step S32, the communication controller 21 executes the address setting process and proceeds to step S31.

If it is determined that the address setting process has been executed the specified number of times, the communication controller 21 proceeds to step S33. In step S33, the communication controller 21 determines whether different types of association information are included in the association of the addresses of the indoor units 3 with the connection precedence to the outdoor unit 2 that are executed the specified number of times. More specifically, the communication controller 21 determines whether first association information and second association information are obtained. The first association information is about the addresses of the indoor units 3 and the connection precedence to the outdoor unit 2. The second association information differs in association from the first association information.

If it is determined that different types of association information are included in the association of the addresses of the indoor units 3 with the connection precedence to the outdoor unit 2, which are executed the specified number of times, the communication controller 21 proceeds to step S34. In step S34, the communication controller 21 determines the association of the addresses of the indoor units 3 with the connection precedence to the outdoor unit 2 and then ends the process. More specifically, the communication controller 21 compares the number of times the first association information is obtained and the number of times the second association information is obtained. Based on the association information obtained the greater number of times, the communication controller 21 determines the association of the addresses of the indoor units 3 with the connection precedence to the outdoor unit 2. In an example, in a case where the number of times the first association information is obtained is greater than the number of times the second association information is obtained, the second association information is discarded from the storage unit 22. The first association information is determined to be correct, and the storage unit 22 keeps only the association of the addresses of the indoor units 3 with the connection precedence to the outdoor unit 2 corresponding to the first association information.

The operation of the present embodiment will be described with reference to FIGS. 3 to 5.

When the communication line 6 provides a serial connection from the outdoor unit 2 to the indoor units 3A to 3K to establish a communication connection, the length of the communication line 6 connecting the outdoor unit 2 and the indoor units 3A to 3K differs between the indoor units 3A to 3K. More specifically, as shown in FIG. 3, the length of the communication line 6 through which communication is performed with the outdoor unit 2 increases in the order of the indoor units 3A, 3B, 3C, 3D, 3E, 3F, 3G, 3H, 3I, 3J, and 3K.

The amplitude of the transmission signal transmitted from the communication controller 21 of the address setting device 20 arranged on the outdoor unit 2 to the indoor units 3A to 3K through the communication line 6 is decreased as the length of the communication line 6 increases (refer to FIG. 4). That is, one or more of the indoor units 3A to 3K cannot receive the transmission signal depending on the length of the communication line 6. The increasing of the amplitude or the lowering of the frequency band extends the transmission distance of the transmission signal.

In this regard, in the present embodiment, the communication controller 21 changes at least one of the amplitude or the frequency band of the transmission signal, so that the indoor units 3A to 3K sequentially respond. The communication controller 21, for example, gradually increases the amplitude of the transmission signal, so that the indoor unit 3A responds first, and the indoor unit 3B responds next. Also, the communication controller 21 gradually lowers the frequency band of the transmission signal to impede attenuation, so that the reachable distance of the transmission signal is increased. The indoor unit 3A responds first, and the indoor unit 3B responds next. Thus, the communication controller 21 sequentially obtains the addresses of the indoor units 3A to 3K and associates the addresses of the indoor units 3A to 3K with the connection precedence.

The present embodiment described above has the following advantages.

(1-1) In the address setting process, the communication controller 21 changes at least one of the amplitude and the frequency band of the transmission signal and associates the address of an indoor unit 3 with the connection precedence of the indoor unit 3 to the outdoor unit 2 based on the reception signal from the indoor units 3. This configuration eliminates the need to control communication circuit disconnectors as described in the prior art during execution of the address setting process and thus readily associates the addresses of the indoor units 3 with the connection precedence of the indoor units 3 to the outdoor unit 2.

(1-2) In the address setting process, the communication controller 21 gradually increases the amplitude of the transmission signal to specify one of the indoor units 3. Based on the reception signal received from the specified indoor unit 3, the communication controller 21 associates the address of the specified indoor unit 3 with the connection precedence to the outdoor unit 2. In this configuration, the gradual increase in the amplitude of the transmission signal gradually extends the transmission distance of the transmission signal and specifies the connection precedence of the indoor units 3 in order starting from ones of the indoor units 3 located closer to the outdoor unit 2.

(1-3) In the address setting process, the communication controller 21 gradually lowers the frequency band of the transmission signal to specify one of the indoor units 3. Based on the reception signal received from the specified indoor unit 3, the communication controller 21 associates the address of the specified indoor unit 3 with the connection precedence to the outdoor unit 2. In this configuration, the gradual lowering of the frequency band of the transmission signal gradually extends the transmission distance of the transmission signal and specifies the connection precedence of the indoor units 3 in order starting from ones of the indoor units 3 located closer to the indoor unit 3.

(1-4) In the address setting process, the communication controller 21 uses the device layout data to associate the installation locations of the indoor units 3 in the device layout data with the addresses of the indoor units 3 and the connection precedence of the indoor units 3 to the outdoor unit 2. This configuration allows the addresses of the actual installed indoor units 3 to be written to the indoor units 3 that are in the device layout data.

(1-5) In the determination process, when the communication controller 21 obtains the first association information, which is about the addresses of the indoor units 3 and the connection precedence to the outdoor unit 2, and the second association information, which differs in association from the first association information, as a result of the address setting process executed the specified number of times, the communication controller 21 compares the number of times the first association information is obtained and the number of times the second association information is obtained. The communication controller 21 associates the addresses of the indoor units 3 with the connection precedence to the outdoor unit 2 based on one of the first association information and the second association information that is obtained the greater number of times than the other. In this configuration, the addresses of the indoor units 3 are more accurately associated with the connection precedence to the outdoor unit 2.

Second Embodiment

A second embodiment will be described below. The present embodiment differs from the first embodiment in the address setting process. The components of the first embodiment are referred to for components of the present embodiment. A system configuration of the present embodiment is not shown in the drawings.

Figure 8:
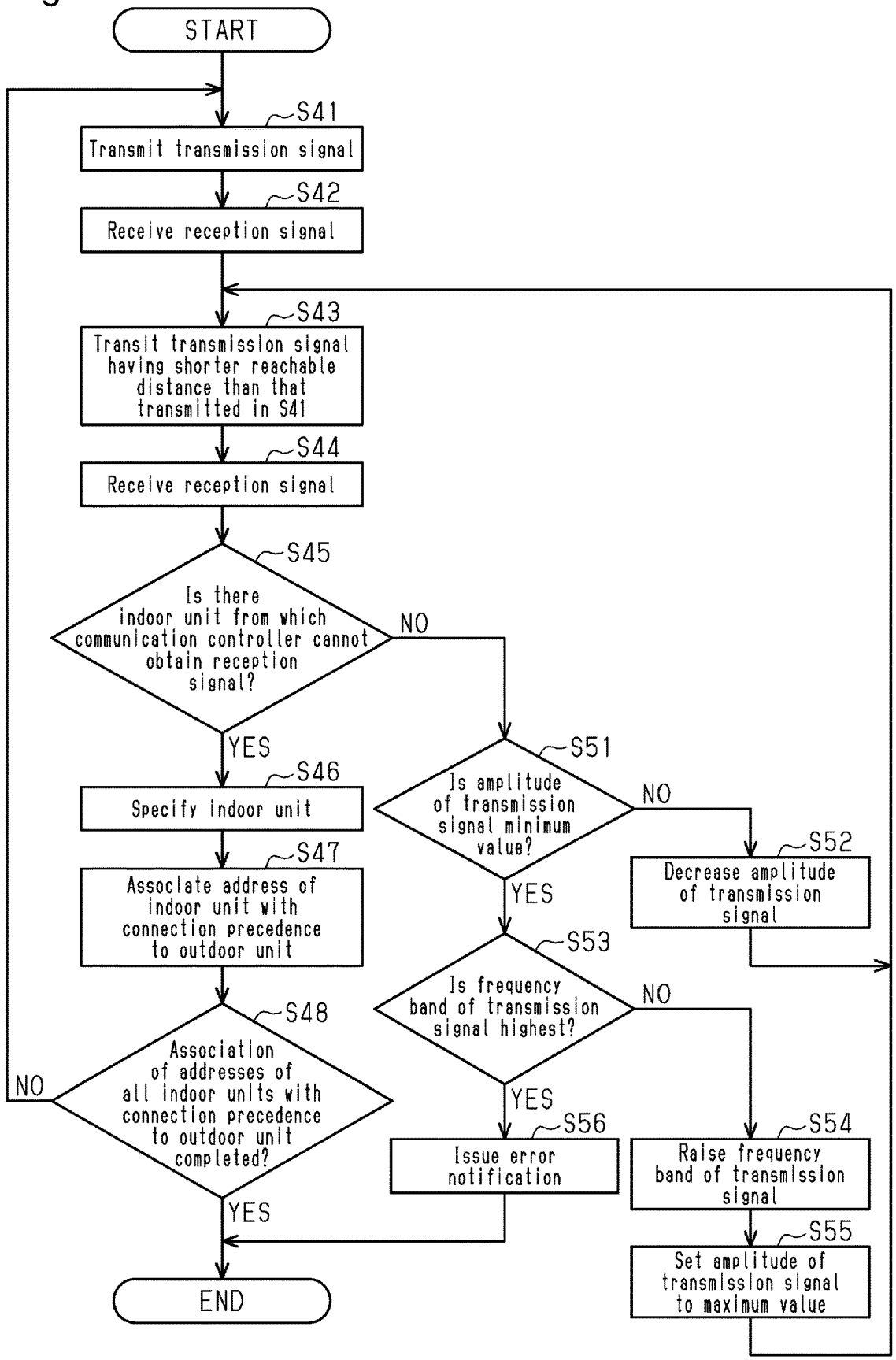
FIG. 8 is a flowchart showing an example of the procedure of an address setting process executed by a communication controller in a second embodiment of an address setting device.

FIG. 8 shows an address setting process of the present embodiment. In step S41, the communication controller 21 transmits a transmission signal toward the indoor units 3 through the communication line 6 and then proceeds to step S42. After the address setting process is started, the communication controller 21 first transmits a transmission signal having the lowest frequency band and the maximum amplitude toward the indoor units 3. In an example, when the first to sixth transmission signals S1 to S6 are set as the transmission signal and the first to third amplitudes A1 to A3 are set, the communication controller 21 transmits the sixth transmission signal S6 having the third amplitude A3 toward the indoor units 3.

In step S42, the communication controller 21 obtains reception signals and then proceeds to step S43. In an example, when transmitting the sixth transmission signal S6 having the third amplitude A3, the communication controller 21 obtains reception signals (response signals) from all of the indoor units 3.

In step S43, the communication controller 21 transmits a transmission signal having a shorter reachable distance than the transmission signal transmitted in step S41 through the communication line 6 and then proceeds to step S44. In an example, the communication controller 21 transmits a transmission signal having a smaller amplitude or a higher frequency band than the transmission signal transmitted in step S41 toward the indoor units 3. In an example, when the transmission signal transmitted in step S41 is the sixth transmission signal S6 having the third amplitude A3, in step S43, the communication controller 21 transmits the sixth transmission signal S6 having the second amplitude A2 toward the indoor units 3. When the transmission signal transmitted in step S41 is the sixth transmission signal S6 having the first amplitude A1, in step S43, the communication controller 21 transmits the fifth transmission signal S5 having the third amplitude A3 toward the indoor units 3.

In step S44, the communication controller 21 obtains reception signals and then proceeds to step S45. In step S45, the communication controller 21 determines whether there is an indoor unit 3 from which the communication controller 21 cannot receive a reception signal (i.e., indoor unit 3 that does not transmit a reception signal to the communication controller 21). If there is an indoor unit 3 from which the communication controller 21 cannot receive a reception signal, the communication controller 21 proceeds to step S46. In step S46, the communication controller 21 specifies one of the indoor units 3 and proceeds to step S47. In an example, when transmitting the sixth transmission signal S6 having the second amplitude A2, the communication controller 21 cannot obtain a reception signal from one of the indoor units 3. In this case, the indoor unit 3 from which the communication controller 21 cannot receive a reception signal is the indoor unit 3 located farthest from the outdoor unit 2 in the communication line 6, that is the indoor unit 3 corresponding to the longest communication line 6, which connects the outdoor unit 2 and the indoor unit 3. Thus, the communication controller 21 specifies one of the indoor units 3.

In step S47, the communication controller 21 associates the address of the specified indoor unit 3 with the connection precedence to the outdoor unit 2 based on the reception signal received in step S42 from the specified indoor unit 3 and then proceeds to step S48.

In step S48, the communication controller 21 determines whether the association of the address of the indoor unit 3 and the connection precedence to the outdoor unit 2 has been completed for all of the indoor units 3. If it is determined that the association of the address of the indoor unit 3 with the connection precedence to the outdoor unit 2 has been completed for all of the indoor units 3, the communication controller 21 ends the process. If it is determined that the association of the address of the indoor unit 3 with the connection precedence to the outdoor unit 2 has not been completed for all of the indoor units 3, the communication controller 21 proceeds to step S41.

In step S45, if it is determined that there is no indoor unit 3 from which the communication controller 21 cannot receive a reception signal, the communication controller 21 changes at least one of the amplitude or the frequency of the transmission signal as described in steps S51 to S56 and again transmits the transmission signal in step S43.

More specifically in step S51, the communication controller 21 determines whether the amplitude of the transmission signal that was transmitted in step S43 is the minimum value. The lowest value of the amplitude of the transmission signal is, for example, a lower limit value of a set amplitude range of the transmission signal. In an example, when the amplitude of the transmission signal is set to one of the first amplitude A1, the second amplitude A2, and the third amplitude A3, the communication controller 21 determines whether the amplitude of the transmission signal equals the first amplitude A1.

In step S43, if the amplitude of the transmission signal is not the minimum value, the communication controller 21 proceeds to step S52. In step S52, the communication controller 21 decreases the amplitude of the transmission signal transmitted in step S43 and then proceeds to step S43. In step S53, the communication controller 21 determines whether the frequency band of the transmission signal transmitted in step S43 is a highest frequency band. The highest frequency band of the transmission signal includes an upper limit value of a set frequency range of the transmission signal.

If the frequency band of the transmission signal transmitted in step S43 is not the highest frequency band, the communication controller 21 proceeds to step S54. In step S54, the communication controller 21 raises the frequency band of the transmission signal transmitted in step S43 and then proceeds to step S55. In step S55, the communication controller 21 sets the amplitude of the transmission signal of step S54 to the maximum value and then proceeds to step S43.

As described above, in the present embodiment, the communication controller 21 gradually decreases the amplitude of the transmission signal to specify one of the indoor units 3. Based on the reception signal received from the specified indoor unit 3, the communication controller 21 associates the address of the specified indoor unit 3 with the connection precedence to the outdoor unit 2. The communication controller 21 gradually raises the frequency band of the transmission signal to specify one of the indoor units 3. Based on the reception signal received from the specified indoor unit 3, the communication controller 21 associates the address of the specified indoor unit 3 with the connection precedence to the outdoor unit 2.

When the frequency band of the transmission signal transmitted in step S43 is the lowest frequency band, the communication controller 21 proceeds to step S56. In step S56, the communication controller 21 issues notification of an error indicating that there is an indoor unit 3 in which the address cannot be associated with the connection precedence to the outdoor unit 2 and ends the process. The error notification process is the same as the address setting process of the first embodiment.

The present embodiment obtains the following advantages in addition to (1-1), (1-4), and (1-5) of the first embodiment.

(2-1) In the address setting process, the communication controller 21 gradually decreases the amplitude of the transmission signal to associate the address of the specified indoor unit 3 with the connection precedence to the outdoor unit 2. In this configuration, the gradual decrease in the amplitude of the transmission signal gradually shortens the transmission distance of the transmission signal and specifies the connection precedence of the indoor units 3 in order starting from ones of the indoor units 3 located farther from the outdoor unit 2.

(2-2) In the address setting process, the communication controller 21 gradually raises the frequency band of the transmission signal to specify one of the indoor units 3. Based on the reception signal received from the specified indoor unit 3, the communication controller 21 associates the address of the specified indoor unit 3 with the connection precedence to the outdoor unit 2. In this configuration, the gradual raise in the frequency band of the transmission signal gradually shortens the transmission distance of the transmission signal and specifies the connection precedence of the indoor units 3 in order starting from ones of the indoor units 3 located farther from the outdoor unit 2.

Modified Examples

The description related to the above embodiments exemplifies, without any intention to limit, applicable forms of an address setting device and an air conditioning system according to the present disclosure. The address setting device and the air conditioning system according to the present disclosure can be applicable to, for example, modified examples of the embodiments that are described below and combinations of at least two of the modified examples that do not contradict each other. In the following modified examples, the same reference characters are given to those elements that are the same as the corresponding elements of the above embodiments. Such elements will not be described in detail.

In the embodiments, the installation location of the address setting device 20 may be changed to any location. The address setting device 20 may be installed in a device other than the outdoor unit 2, for example, a predetermined one of the indoor units 3 or the system management device 4. When the address setting device 20 is installed in the system management device 4, the communication controller 21 transmits a transmission signal toward the indoor units 3 through, for example, the outdoor unit 2 and the communication line 6.

In the embodiments, the process for obtaining the number of indoor units 3 connected to the outdoor unit 2 may be changed to any process. In an example, the communication controller 21 transmits a transmission signal having a predetermined amplitude or a predetermined frequency band (e.g., transmission signal having the maximum amplitude and the lowest frequency band: the sixth transmission signal S6 having the third amplitude A3) instead of the device layout data. In this case, when all of the connected indoor units 3 transmit reception signals (response signals) toward the outdoor unit 2, the number of indoor units 3 connected to the outdoor unit 2 is obtained. The communication controller 21 repeatedly changes at least one of the amplitude or the frequency of a transmission signal and transmits the transmission signal until the addresses of the indoor units 3, which correspond to the number of indoor units 3 connected, are associated with the connection precedence to the outdoor unit 2.

In the embodiments, when an indoor unit 3 is specified, the communication controller 21 may prohibit the specified indoor unit 3 from transmitting a reception signal. In an example, the communication controller 21 transmits a control signal indicating prohibition of transmission of a reception signal toward the indoor unit 3. Instead of transmitting the control signal, a transmission signal may include information that prohibits the indoor unit 3 that transmitted a reception signal from again transmitting a reception signal. As a result, the controller 34 of the indoor unit 3 determines whether a reception signal is transmitted and, when the reception signal is transmitted, prohibits another transmission of a reception signal.

In the embodiments, the communication controller 21 may be configured not to change the frequency band of the transmission signal and configured to change only the amplitude of the transmission signal. Alternatively, the communication controller 21 may be configured to change only the frequency band of the transmission signal. That is, the communication controller 21 may change a parameter of the transmission signal so that the reachable distance of the transmission signal in the communication line 6 is changeable.

Figure 9:
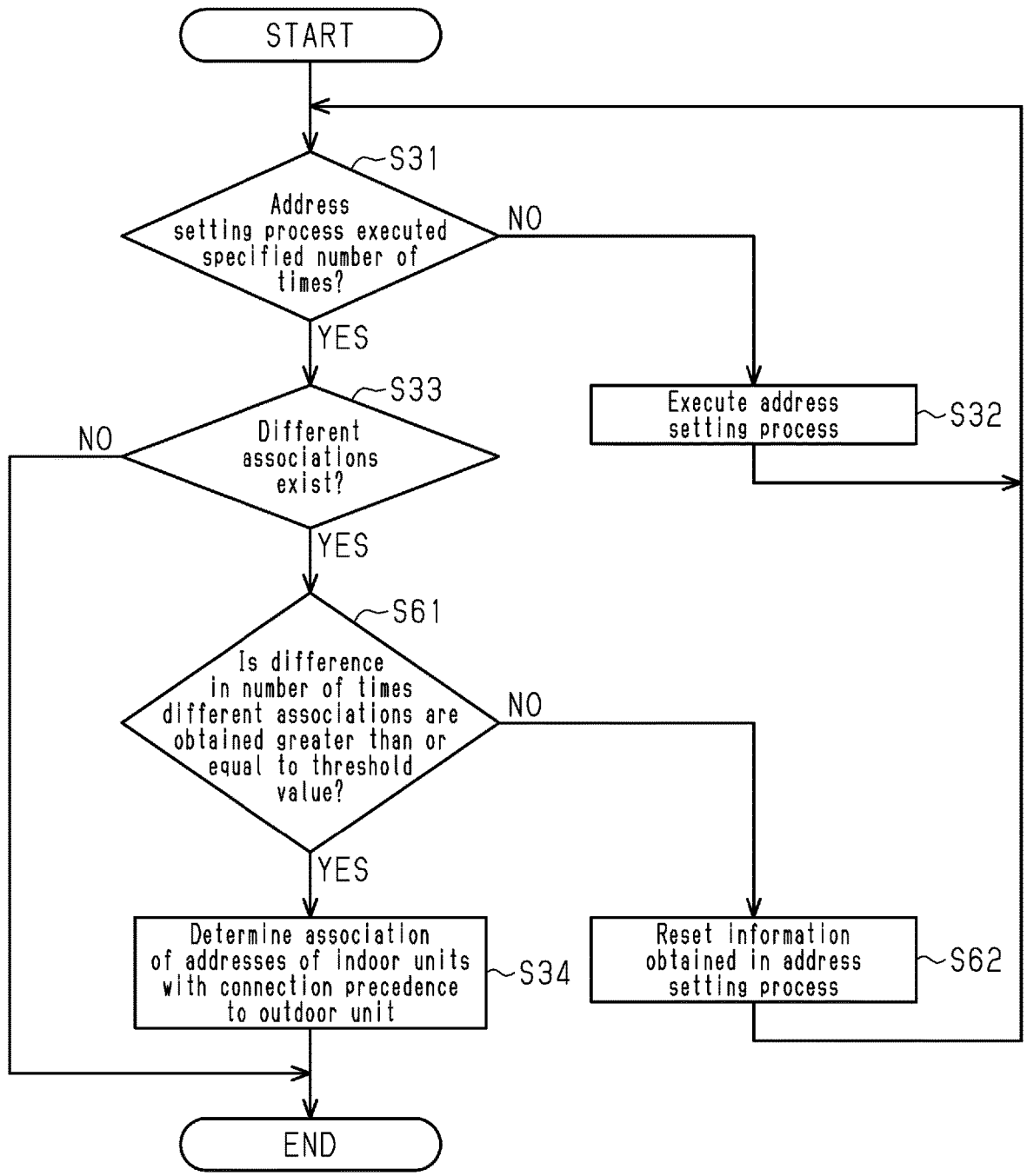
FIG. 9 is a flowchart showing an example of the procedure of a determination process executed by a communication controller in a modified example of an address setting device.

In the determination process of the embodiments, the communication controller 21 may determine association when a difference in the number of times obtained is greater than or equal to a threshold value. When the difference in the number of times obtained is less than the threshold value, the determination process may be considered as an error without determining the association. In an example, the communication controller 21 may execute a determination process shown in FIG. 9 instead of the determination process shown in FIG. 7. The determination process shown in FIG. 9 is obtained by adding step S61 between step S33 and step S34 of the determination process shown in FIG. 7. When different types of association information are included in the association of the addresses of the indoor units 3 with the connection precedence to the outdoor unit 2, which are executed the specified number of times, in step S61, the communication controller 21 determines whether a difference in the number of times different types of association information are obtained is greater than or equal to the threshold value. In an example, when the first association information and the second association information are obtained, it is determined whether the difference between the number of times the first association information is obtained and the number of times the second association information is obtained is greater than or equal to the threshold value. If the difference in the number of times the different types of association information are obtained is greater than or equal to the threshold value, the communication controller 21 proceeds to step S34. If the difference in the number of times the different types of association information are obtained is less than the threshold value, in step S62, the communication controller 21 resets the information obtained in the address setting process and again executes the address setting process the specified number of times. In an example, if the difference in the number of times the first association information is obtained and the number of times the second association information is obtained is less than the threshold value, the first association information and the second association information are discarded from the storage unit 22, and the address setting process is again executed the specified number of times.

In the embodiments, the address setting device 20 is applied to the air conditioning system 1 but is not limited to the air conditioning system 1. The address setting device 20 may be applicable to any communication system that includes a communication line that provides a serial connection from a first device to second devices to establish a communication connection. In an example, the air conditioning system 1 may be replaced with a refrigeration system, lighting of a building, or a broadcast facility.

While the embodiments of the device have been described herein above, it is to be appreciated that various changes in form and detail may be made without departing from the spirit and scope of the device presently or hereafter claimed.

The invention claimed is:

1. An address setting device in a communication system, wherein the communication system includes a first device, second devices, and a communication line providing a serial connection from the first device to the second devices to establish a communication connection, and the address setting device is configured to set addresses of the second devices, the address setting device comprising:
   a communication controller configured to
      transmit a transmission signal toward the second devices through the communication line and change at least one of an amplitude or a frequency of the transmission signal, and
      associate the addresses of the second devices with connection precedence of the second devices to the first device based on a reception signal received through the communication line.

2. The address setting device according to claim 1, wherein the communication controller is configured to
   specify one of the second devices by gradually increasing or gradually decreasing the amplitude of the transmission signal, and
   associate the address of the specified second device with the connection precedence to the first device based on a reception signal received from the specified second device.

3. The address setting device according to claim 2, wherein the communication controller is configured to
   specify one of the second devices by gradually raising or gradually lowering a frequency band of the transmission signal, and
   associate the address of the specified second device with the connection precedence to the first device based on a reception signal received from the specified second device.

4. The address setting device according to claim 2, wherein the communication controller is configured to
   use device layout data in which installation locations of the second devices are set, and
   associate the installation locations of the second devices, which are in the device layout data, with the addresses of the second devices and the connection precedence to the first device.

5. The address setting device according to claim 2, wherein the communication controller is configured to
   transmit the transmission signal having a predetermined amplitude or a predetermined frequency band to obtain a number of the second devices connected to the first device, and
   repeatedly transmit the transmission signal in which at least one of the amplitude or the frequency is changed, until the addresses of the second devices corresponding to the connected number of the second devices are associated with the connection precedence to the first device.

6. The address setting device according to claim 2, wherein the communication controller is configured to
   execute association of the addresses of the second devices with the connection precedence to the first device multiple times,
   as a result of executing multiple times, obtain first association information about the addresses of the second devices and the connection precedence to the first device and second association information differing in association from the first association information, and
   associate the addresses of the second devices with the connection precedence to the first device based on one of the first association information and the second association information that is obtained a greater number of times than the other.

7. An air conditioning system, comprising:
   the address setting device according to claim 2, wherein the first device is an outdoor unit, and
   the second devices are indoor units.

8. The address setting device according to claim 1, wherein the communication controller is configured to
   specify one of the second devices by gradually raising or gradually lowering a frequency band of the transmission signal, and
   associate the address of the specified second device with the connection precedence to the first device based on a reception signal received from the specified second device.

9. The address setting device according to claim 8, wherein the communication controller is configured to
   use device layout data in which installation locations of the second devices are set, and
   associate the installation locations of the second devices, which are in the device layout data, with the addresses of the second devices and the connection precedence to the first device.

10. The address setting device according to claim 8, wherein the communication controller is configured to transmit the transmission signal having a predetermined amplitude or a predetermined frequency band to obtain a number of the second devices connected to the first device, and repeatedly transmit the transmission signal in which at least one of the amplitude or the frequency is changed, until the addresses of the second devices corresponding to the connected number of the second devices are associated with the connection precedence to the first device.

11. The address setting device according to claim 8, wherein the communication controller is configured to execute association of the addresses of the second devices with the connection precedence to the first device multiple times, as a result of executing multiple times, obtain first association information about the addresses of the second devices and the connection precedence to the first device and second association information differing in association from the first association information, and associate the addresses of the second devices with the connection precedence to the first device based on one of the first association information and the second association information that is obtained a greater number of times than the other.

12. The address setting device according to claim 1, wherein the communication controller is configured to use device layout data in which installation locations of the second devices are set, and associate the installation locations of the second devices, which are in the device layout data, with the addresses of the second devices and the connection precedence to the first device.

13. The address setting device according to claim 12, wherein the communication controller is configured to transmit the transmission signal having a predetermined amplitude or a predetermined frequency band to obtain a number of the second devices connected to the first device, and repeatedly transmit the transmission signal in which at least one of the amplitude or the frequency is changed, until the addresses of the second devices corresponding to the connected number of the second devices are associated with the connection precedence to the first device.

14. The address setting device according to claim 12, wherein the communication controller is configured to execute association of the addresses of the second devices with the connection precedence to the first device multiple times, as a result of executing multiple times, obtain first association information about the addresses of the second devices and the connection precedence to the first device and second association information differing in association from the first association information, and associate the addresses of the second devices with the connection precedence to the first device based on one of the first association information and the second association information that is obtained a greater number of times than the other.

15. The address setting device according to claim 1, wherein the communication controller is configured to transmit the transmission signal having a predetermined amplitude or a predetermined frequency band to obtain a number of the second devices connected to the first device, and repeatedly transmit the transmission signal in which at least one of the amplitude or the frequency is changed, until the addresses of the second devices corresponding to the connected number of the second devices are associated with the connection precedence to the first device.

16. The address setting device according to claim 15, wherein the communication controller is configured to execute association of the addresses of the second devices with the connection precedence to the first device multiple times, as a result of executing multiple times, obtain first association information about the addresses of the second devices and the connection precedence to the first device and second association information differing in association from the first association information, and associate the addresses of the second devices with the connection precedence to the first device based on one of the first association information and the second association information that is obtained a greater number of times than the other.

17. The address setting device according to claim 1, wherein the communication controller is configured to execute association of the addresses of the second devices with the connection precedence to the first device multiple times, as a result of executing multiple times, obtain first association information about the addresses of the second devices and the connection precedence to the first device and second association information differing in association from the first association information, and associate the addresses of the second devices with the connection precedence to the first device based on one of the first association information and the second association information that is obtained a greater number of times than the other.

18. An air conditioning system, comprising:

the address setting device according to claim 1, wherein the first device is an outdoor unit, and the second devices are indoor units.

19. The air conditioning system according to claim 18, wherein the address setting device is arranged on the outdoor unit.

20. The air conditioning system according to claim 18, wherein the air conditioning system further comprises a central management device centrally controlling the outdoor unit and the indoor units, and the address setting device is arranged on the central management device.

* * * * *